United States Patent [19]

Grau

[11] Patent Number: 4,809,742
[45] Date of Patent: Mar. 7, 1989

[54] CONTROL VALVE ASSEMBLY INCLUDING VALVE POSITION SENSOR

[75] Inventor: Richard Grau, Kalamazoo, Mich.

[73] Assignee: Pneumo Abex Corporation, Boston, Mass.

[21] Appl. No.: 182,400

[22] Filed: Apr. 18, 1988

[51] Int. Cl.[4] .............................................. F16K 37/00
[52] U.S. Cl. ............................... 137/554; 251/129.11; 251/129.15; 340/870.31; 324/208
[58] Field of Search .................. 137/554; 251/129.11, 251/129.15; 340/870.31; 324/207, 208

[56] References Cited

U.S. PATENT DOCUMENTS

| | | | |
|---|---|---|---|
| 4,013,911 | 3/1977 | Fujiwara et al. | 324/208 X |
| 4,359,685 | 11/1982 | Eguchi et al. | 324/208 |
| 4,385,297 | 5/1983 | Schmitt et al. | 340/870.31 |
| 4,392,375 | 7/1983 | Eguchi et al. | 324/208 X |
| 4,395,711 | 7/1983 | Ward | 340/870.31 |
| 4,673,876 | 6/1987 | Paulsen | 324/208 |
| 4,678,992 | 7/1987 | Hametta | 324/208 |
| 4,690,168 | 9/1987 | Kihm | 137/554 |

*Primary Examiner*—John Rivell
*Attorney, Agent, or Firm*—Renner, Otto, Boisselle & Sklar

[57] ABSTRACT

An electromechanical valve assembly incorporates an electromechanical actuator, such as a limited angle torque motor or solenoid, to open or close the valve in response to a direct current or low frequency electrical signal. A valve position sensor detects the valve position in response to a second, relatively high frequency electrical signal. The actuator and sensor are electrically connected in parallel so that the valve may be actuated and the valve position may be determined through a single pair of electrical leads. The position sensor preferably includes an electrical coil having a reactance that varies with incident magnetic flux, the magnitude of which depends on valve position.

23 Claims, 2 Drawing Sheets

CONTROL VALVE ASSEMBLY INCLUDING VALVE POSITION SENSOR

BACKGROUND

This invention relates generally, as indicated, to a control valve assembly including valve position sensor especially of the type used for aircraft flight controls or other actuation control systems which require a high degree of reliability.

A characteristic of these systems is the requirement that the state of the valve (i.e., whether open, closed, or in between) or the actual position of the valve (i.e., open, closed, or the degree that the valve is open or closed) must be measured and an electrical signal equivalent to this measurement transmitted back to a control unit which monitors the valve operation. Heretofore, this was conventionally done by coupling a position measuring device such as an electrical valve position transducer to the valve element. The operation of these transducers requires interfacing hardware and, at a minimum, additional electrical leads extending from the valve to the interfacing hardware, which add expense. Also, in many applications it is particularly undesirable to include a second set of lead wires because of space, weight and other limitations. Accordingly, it would be desirable to provide a valve incorporating a remotely readable valve position indicator that employs a minimum number of components in addition to the valve parts and that does not require additional electrical leads.

SUMMARY OF THE INVENTION

The present invention allows for determining valve position or state without adding additional signal transmission wires and a technique for integrating the measuring devices into the valve assembly with a minimum of added parts. Also, such invention allows for measuring the valve position irrespective of whether or not a valve control signal is present. Such a flow control valve with valve position sensing is intended primarily for aircraft flight control systems which use redundancy in control components, but may also be used in other actuation control systems which require a high degree of reliability.

In accordance with one aspect of the invention, one or more control channels may be provided which (if more than one) can independently or cooperatively position the valve element to produce a desired load flow and which continuously returns an electrical signal which is proportional to valve position.

In accordance with another aspect of the invention, a simple control circuit may be provided which will drive the valve to commanded position, excite the valve position transducer, and detect the valve position electrically using two wires per control channel.

Further in accordance with the invention, the valve is desirably provided with valve position sensing implementation which can have one to four electrical control and sensing channels.

In accordance with another aspect of the invention, such valve position sensing concept may be provided with direct current electrical isolation between components of the valve driver and valve position sensing circuits.

Also in accordance with the invention, such flow control valve with valve position sensing may be applicable to both rotary (direct drive motors) and linear (solenoid) valve force motors.

Still further in accordance with the invention, such flow control valve with valve position sensing may use either variable reluctance sensors of the variable gap type or variable reluctance sensors of the saturable reactor type.

According to the invention, an electromechanical valve assembly is provided which includes a valve having open and closed positions for controlling fluid communication between valve ports, an electromechanical actuator for opening and closing the valve in response to a direct current or relatively low frequency electrical signal applied to electrical leads connected to the actuator, and a sensor for detecting the position of the valve in response to the application of a second electrical signal having a relatively high frequency to the electrical leads of the actuator.

In one embodiment, the actuator comprises a limited angle electrical torque motor having a shaft for translating a valve spool. In that embodiment, the sensor may include a permanent magnet mounted on the motor shaft. A coil or saturable reactor detects the intensity of the magnetic field produced by the permanent magnet which is used to determine shaft and thus valve position.

In another embodiment, the actuator comprises an armature of a spring biased solenoid that responds to a direct current or low frequency signal to open and close the valve. A suitable sensor in that embodiment includes an electrical coil wound on a magnetic core to produce a magnetic flux path including the armature. The reluctance of the magnetic circuit, as sensed by the coil, is directly related to the position of the armature, i.e. the position of the valve. Preferably, the sensor coil is in communication with the electrical leads of the solenoid coil through a transformer formed by that coil and a second coil.

A valve incorporating indicating apparatus according to the present invention is employed with a first electrical power source providing a direct current or relatively low frequency first signal for actuating the valve. Preferably, the frequency of that signal ranges from zero to not more than about 200 Hertz (Hz). The second electrical signal for energizing the sensor and determining valve position is produced by a second signal generator and preferably has a frequency exceeding about 20 kHz. The two power sources are electrically isolated from each other by reactive circuit elements that tend to exclude high frequency signals from the first source and that tend to exclude low frequency signals from the second source. The second electrical signal may be applied directly to the electrical leads of the valve actuator or may be coupled to those leads through a transformer.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTOIN OF THE PREFERRED EMBODIMENTS

Figure 1:
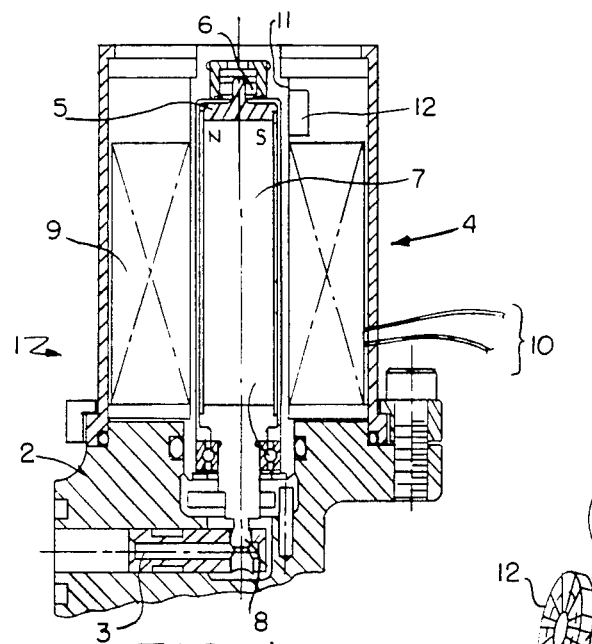
FIG. 1 is a schematic fragmentary sectional view through one form of control valve assembly incorporating a position sensor according to the invention.

In FIG. 1 a valve assembly 1 incorporating a position sensor 12 in accordance with the invention is shown in sectional view. Valve assembly 1 includes a valve body 2, usually metal, for containing a fluid, having several fluid-admitting ports (not shown), and a valve spool 3 for controlling fluid communication between the several ports. Actuation of the valve is controlled by an electromechanical actuator which in the form shown in FIG. 1 is a limited angle torque motor 4 as described hereafter.

Valve actuator 4 includes a shaft 5 rotationally mounted in bearings 6. Mounted on the shaft 5 is a permanent magnet 7 having opposed north and south poles N and S. The north and south poles of the magnet are mounted transversely to the direction of rotation of shaft 5. One end of shaft 5 terminates in an eccentric drive member 8 that engages the valve spool 3 mounted transversely to member 8. Spool 3 may be biased with a force applied by a spring or other means so that contact between the spool and drive member 8 is maintained. When shaft 5 rotates, spool 3 moves transversely relative to the axis of rotation of shaft 5. Since drive member 8 is eccentric in a plane transverse to the direction of rotation of shaft 5, rotation of shaft 5 results in translation of spool 3.

Fluid communication between the valve ports (not shown) is controlled by the position of valve spool 3. Typically, an inlet port is connected to a pressurized source of a fluid, such as a hydraulic fluid. An outlet port is typically connected to a low pressure return or reservoir for receiving the fluid being drained from a higher pressure volume through the valve. A cylinder port is in fluid communication with a hydraulic device such as a hydraulic actuator. In this arrangement, the position of spool 3 determines what pair of valve ports are in communication with each other. For example, in an open position, hydraulic fluid under pressure may be admitted into the valve through the inlet port and allowed to flow out through the cylinder port in order to operate a hydraulic cylinder. When the valve is in a closed position, hydraulic fluid is permitted to drain from the cylinder port, i.e. from a hydraulic cylinder, into an unpressurized reservoir through the outlet port. A valve, particularly of the spool type shown in FIG. 1, can also assume intermediate positions between the open and closed positions. In these intermediate positions, the rate of fluid flow between pairs of ports may be regulated.

In a typical valve assembly of the type described, the eccentricity of drive member 8 permits the full travel of valve spool 3 in response to less than one-half turn of motor shaft 5. Drive motor 4 is electrically actuated by applying a direct current or low frequency signal to an electrical coil 9 through its electrical leads 10. (While a pair of electrical wires are shown as leads 10, if the body of the valve assembly (motor) is electrically conductive, it may act as one of the leads. The use of the valve assembly body as a lead may be particularly advantageous where the valve assembly is mounted on an electrically conductive chassis, such as an airframe.) Coil 9 is coaxially disposed about shaft 5. When coil 9 is energized, it produces a magnetic field that interacts with the field produced by magnet 7. That interaction results in the application of a torque to shaft 5, turning it about its axis to alter the position of drive member 8 and thus valve spool 3 driven thereby. By maintaining an appropriate magnitude and polarity of the current flowing through coil 9, valve 3 can be opened, closed or maintained in an intermediate position between the opened and closed positions.

As seen in FIG. 1, magnet 7 extends beyond coil 9 in the axial direction. Proximate coil 9 on an internal wall 11 of motor 4 and opposite the extension of magnet 7, a magnetic field intensity sensor 12 is mounted within motor 4. Sensor 12 can detect the magnitude of a magnetic field. Because magnet 7 has opposed poles transversely disposed relative to the axis of rotation of shaft 5, sensor 12 can be employed to detect the relative rotational position of magnet 7, which indicates whether valve 3 is opened, closed or in an intermediate position. This arrangement is shown more clearly in the detailed view of FIG. 2.

Figure 2:
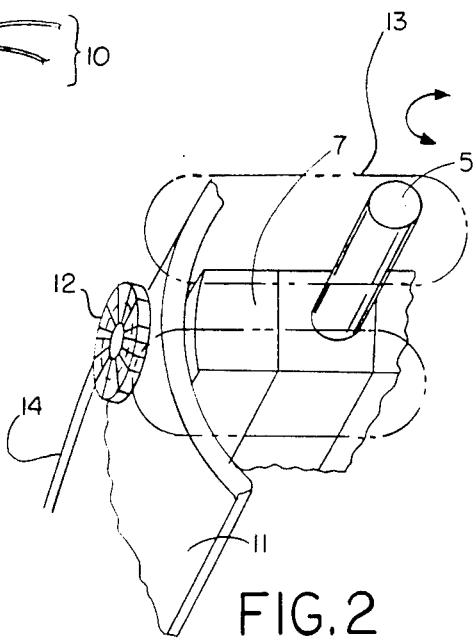
FIG. 2 is a partial, detailed view of the position sensing elements of FIG. 1.

In FIG. 2, a portion of internal wall 11 is shown with sensor 12 mounted on it. Permanent magnet 7 mounted on shaft 5 is disposed inside wall 11 opposite sensor 12. Sensor 12 may be a coil of wire wound around an axis that is mounted generally perpendicular to the axis of rotation of shaft 5. The coil includes a magnetic core or form on which it is wound in order to produce a response to an external magnetic field.

Magnet 7 produces magnetic flux lines following the paths generally indicated by the broken lines 13 of FIG. 2. As is apparent from FIG. 2, in the position of magnet 7 shown, many flux lines pass through sensor 12 and magnetically saturate the magnetic core on which the coil is wound. As a result of this saturation, the reactance of the coil is reduced, from the value when no magnetic flux is present, to a relatively low value. When magnet 7 is rotated 90° from the position shown in FIG. 2, about the axis of rotation of shaft 5, the magnetic flux lines it generates are generally parallel to the windings of sensor 12. In that position, the coupling between the magnetic core of sensor 12 and magnet 7 is substantially reduced. The core is no longer magnetically saturated and therefore the reactance of sensor 12 increases to its maximum value. When magnet 7 is in a position intermediate the two positions just described, the reactance of sensor 12 is also intermediate the two extremes just described.

The reactance of sensor 12 can be measured by applying an alternating current signal to the electrical leads 14 that extend from the sensor (see FIG. 2). By measuring the reactance of sensor coil 12, the relative position of shaft 5 can be determined. If the rotational travel of shaft 5 is only 90°, interrogation of sensor 12 can determine with substantial accuracy whether the valve is open, closed or in an intermediate position. If a valve has only open and closed positions, shaft position can be readily determined by providing a magnet having poles producing significantly different magnetic fluxes at the sensor for the two different valve positions.

Figure 3:
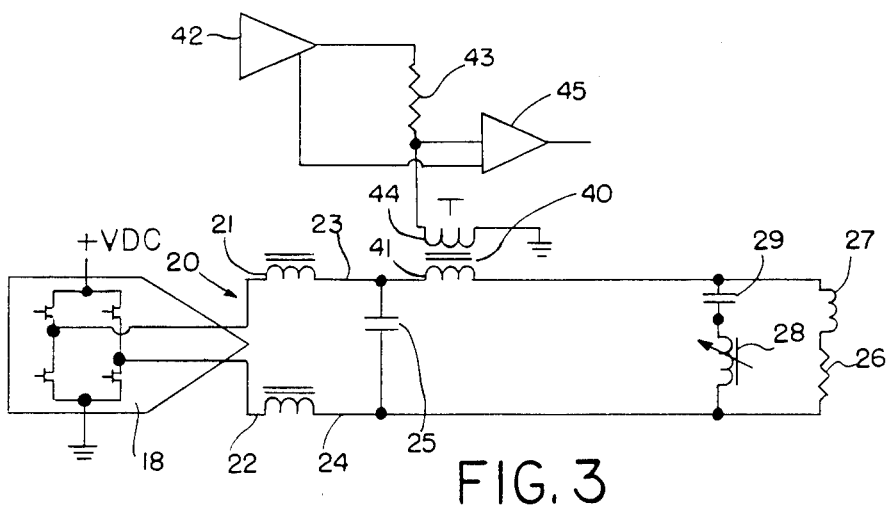
FIG. 3 is a schematic diagram of electrical circuitry for a valve incorporating a position sensor of the type shown in FIGS. 1 and 2.

An important advantage of the invention is the provision of a valve position sensor that can be interrogated over the same two electrical leads used to actuate the valve. The valve embodiment described for FIGS. 1 and 2 can be employed with a single pair of electrical leads for altering valve position and for determining valve position. An example of an electrical circuit that permits valve position adjustment and valve position sensing over a single pair of electrical leads is illustrated schematically in FIG. 3. In FIG. 3 a low frequency or direct current power source 18 is provided for energizing the valve position actuation means, such as winding 9 of FIG. 1. Typically, when an alternating current signal is employed to actuate the valve, its frequency will not exceed about 200 Hz. Source 18 is electrically isolated from the relatively high frequency interrogating signal of the position sensor by a filter 20. The filter 20 includes two inductors 21 and 22, one of which is connected in series with each of the two output leads 23 and 24 from source 18. A capacitor 25, which appears as a short circuit to relatively high frequency signals, is connected across leads 23 and 24. These leads 23 and 24 are also connected to the input leads, such as leads 15, of valve drive motor 4.

Valve actuating coil 9 appears in FIG. 3 as its electrical equivalents, a resistor 26 connected in series with an inductor 27. Leads 23 and 24 are also connected to the leads, such as leads 14, of the magnetic position sensor 12. Sensor 12 behaves as a variable inductance and is shown in FIG. 3 as variable inductor 28. The inductance varies with the amount of coupling of magnetic flux from magnet 7 to sensor coil 12. In order to exclude relatively low frequency signals from inductor 28, a capacitor 29 is connected in series with variable inductor 28. Inductor 28 and series connected capacitor 29 are together connected in parallel across leads 23 and 24. By virtue of the connection of the reactive circuit elements in FIG. 3, a relatively low frequency signal from source 18 primarily reaches valve actuating coil 9 and tends to be excluded from position sensing inductor 28. Likewise, a relatively high frequency sensor interrogating signal from the source described below primarily reaches the position sensing coil 28 and tends to be excluded from actuating inductor 27.

The relatively high frequency interrogating signal may be supplied to coil 9 by a direct or indirect connection to one of leads 23 and 24. A preferred, indirect connection is illustrated in FIG. 3. There, a transformer 40 including a secondary winding 41 connected in series with lead 23 provides an indirect connection between a source 42 of a relatively high frequency signal and coil 28. Source 42 may be a conventional electronic oscillator, preferably having a frequency of about 50 kHz, and, in any event, having a frequency greater than about 20 kHz. The output signal from oscillator 42 is supplied through a resistor 43 to the primary winding 44 of transformer 40. A differential amplifier 45 has one of its output leads connected to the junction of resistor 43 and the ungrounded end of the primary winding 44 of transformer 40. Amplifier 45 is employed to measure the relative magnitude of the relatively high frequency signal. When the reactance of coil 28 is high, amplifier 45 receives a relatively large magnitude input signal and produces a corresponding output signal. Likewise, a low reactance in coil 28 puts a heavier load on oscillator 42 and produces a lower input signal to amplifier 45 and its output signal correspondingly changes. As an alternative to the circuitry of FIG. 3, transformer 40 can be eliminated and resistor 43 can be directly connected to lead 23.

Signal generators 18 and 42 function independently and can be operated independently of each other. That is, their signals can be generated simultaneously or at different times. Signal generator 18 is preferably an H-bridge that can produce pulses of opposed polarities for rotating shaft 5 in either of the desired directions, through a desired angular displacement.

While the preceding discussion particularly concerns a remotely actuable valve employing a limited angle torque motor for actuation, the invention can also be employed in a solenoid valve. A solenoid valve assembly 50 is shown in a sectional view in FIG. 4. Like valve assembly 1, valve assembly 50 includes a body, plural ports in the body and a translatable member for changing the fluid communication between respective pairs of the ports. Unlike valve assembly 1, valve assembly 50 includes a poppet 51 that is biased to maintain communication between a particular pair of the ports in the absence of an electrical actuating signal. An electrical coil 52 having electrical leads 53 is disposed within the body of valve assembly 50. (An electrical connector providing three terminals for leads 53 is built into the valve assembly body. Only two of the terminals are used.) Cylindrical coil 52 is coaxially disposed about a solenoid armature 54 that can be translated along the axis of coil 52. When coil 52 is energized with a low frequency or direct current electrical signal, solenoid armature 54 is translated along the axis of coil 52 from the release position to an engaged position. Generally, armature 54 will remain in the engaged position so long as sufficient electrical current flows through coil 52. However, an electromechanical latching mechanism of conventional type may be provided so that the armature can be held in the engaged position without continuously applying current to coil 52. In those valves, armature 54 is released by the application of a second pulse of electrical current applied to the coil.

Figure 4:
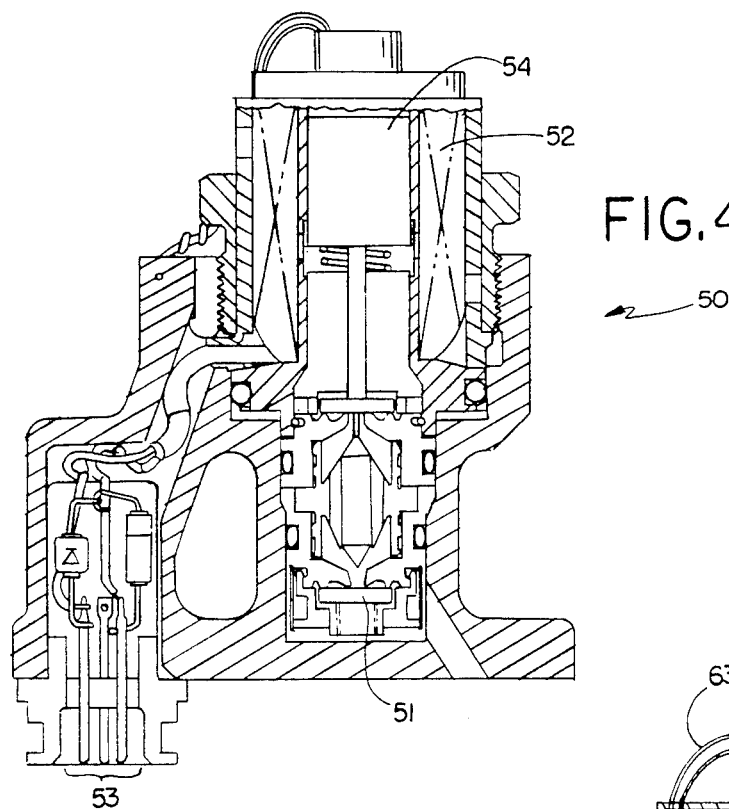
FIG. 4 is a schematic sectional view through another form of control valve assembly including a solenoid valve incorporating a position sensor according to the invention.
Figure 5:
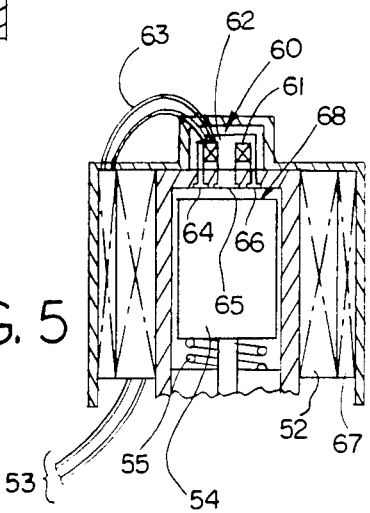
FIG. 5 is a partial, detailed sectional view of the solenoid valve and position sensor of FIG. 4.

In FIG. 5, a portion of valve assembly 50 of FIG. 4 is shown in a detailed view that depicts the incorporated position sensing elements. Armature 54 is urged upward as viewed in FIG. 5 by a biasing spring 55 positioned coaxially within cylindrical coil 52. When coil 52 is energized, solenoid armature 54 is displaced downwardly to change the position of the valve of which it is part. Armature 54 is soft iron so that it responds to the magnetic field created by an electrical current flowing through coil 52.

The position of armature 54 is determined with a reluctance-type sensor 60. Sensor 60 includes an electrical coil 61 wound on a magnetic core 62. Coil 61 is energized through its leads 63 with the relatively high frequency signal previously discussed. Core 62 includes three legs 64, 65 and 66 that terminate in the direction of armature 54 and have gaps between them. When coil 61 is energized, a magnetic field having flux lines directed by the shape of core 62 is produced. Those flux lines extend from legs 64, 65 and 66 to form closed loops. In the view of FIG. 5, those flux loops pass through, i.e. are coupled to, armature 54. When armature 54 is displaced downwardly, an air gap 68 is placed between legs 64–66 and armature 54. As a result, the amount of magnetic coupling decreases resulting in a change in the reactance of coil 61. The reactance alteration is determined by applying a relatively high frequency interrogating signal to coil 61. The result is a determination of valve position from sensor reactance in a manner analogous to that described in connection with FIG. 2 for valve assembly 1.

In the structure of FIG. 5, both the relatively low frequency armature displacing signal and the relatively high frequency position interrogating signal are supplied through leads 53. However, unlike the electrical schematic diagram of FIG. 3, there is no direct electrical connection between the position sensing coil 61 and the actuating coil 52. Rather, in FIG. 5, a cylindrical coil 67 is disposed coaxially with coil 52. Those coils 52, 67 are shown in physical, but not electrical, contact in order to improve the magnetic coupling between them. Coil 52 is the primary winding of a transformer and coil 67 is the secondary. The relatively high frequency signal is coupled from coil 52 to coil 67 to energize coil 61 and vice versa in order to sense the reactance of sensor 60. A schematic diagram of preferred circuitry for driving the electrical and mechanical arrangement of FIG. 5 is shown in FIG. 6.

Figure 6:
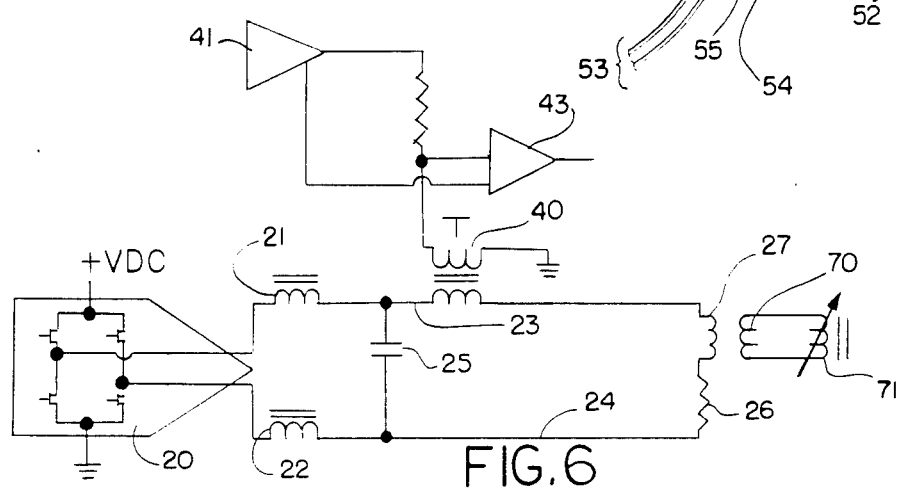
FIG. 6 is a schematic diagram of circuitry for a valve incorporating a position sensor of the type shown in FIGS. 4 and 5.

In FIG. 6, driving circuitry for the arrangement of FIG. 5, similar to that of FIG. 3, is shown schematically. In FIGS. 3 and 6, like elements are given the same reference numerals. The only difference between the schematic diagrams of FIGS. 3 and 6 is in the position sensing arrangement. Position sensing coil 28 of FIG. 3 has become position sensing coil 71 of FIG. 6. Position sensing coil 71 is connected to coil 70 which is the secondary coil of a transformer. The primary coil of the transformer is coil 27 which is the actuating coil of the solenoid valve. Coils 27 and 70 respectively correspond to coils 52 and 67 of FIG. 5. Because of the presence of the transformer formed by these coils in the circuitry of FIG. 6, capacitor 29 of FIG. 3 is not present nor needed in the circuitry of FIG. 6. There is no direct connection between the actuating and sensing coils and the transformer they form is very inefficient at low frequencies. Therefore no direct current and little low frequency current will be transferred from coil 27 through coil 70 and onward to position sensing coil 71. Again, as is apparent in FIG. 6, both the relatively low frequency actuating signal and the relatively high frequency sensing signal are dispatched over leads 23 and 24 (one of which may actually be the valve assembly body), the sole pair of electrical wires extending to the valve.

In any embodiment of a valve according to the invention, the position of the valve can be determined while a valve actuating signal is being applied to the valve. However, because of the independence of the valve position indicating signal and valve actuating signal, those signals can also be applied at different times. Also, such proportional position measuring systems are equally applicable to four way servo valves.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

I claim:

1. An electromechanical valve assembly incorporating a valve position indicator comprising valve means movable between open and closed positions, electromechanical means having a pair of electrical leads for actuating said valve means between said open and closed positions in response to a first electrical signal having a relatively low frequency applied to said leads, and sensing means for disclosing the position of said valve in response to a second electrical signal having a relatively high frequency applied to said leads.

2. The valve assembly of claim 1 wherein said electromechanical means includes means for modulating said valve means to a position intermediate of said open and closed positions.

3. The valve assembly of claim 1 wherein said sensing means comprises means for producing a magnetic field indicative in intensity of the position of said valve means, and means for detecting the relative intensity of said magnetic field.

4. The valve assembly of claim 3 wherein said means for detecting comprises an electrical coil disposed on a magnetic core and electrically connected in parallel to said electromechanical means.

5. The valve assembly of claim 3 wherein said means for producing comprises a permanent magnet.

6. The valve assembly of claim 3 wherein said means for detecting comprises a magnetically saturable reactor.

7. The valve assembly of claim 3 wherein said electromechanical means comprises a limited angle torque motor having a shaft, said means for producing comprises a permanent magnet having opposed poles mounted transversely to said shaft, and said means for detecting comprises a sensing coil wound on a magnetic core and disposed opposite the poles of said permanent magnet.

8. The valve assembly of claim 7 wherein said coil and core comprise a magnetically saturable reactor.

9. The valve assembly of claim 7 including a capacitor electrically connected in series with said sensing coil to exclude said first signal from said sensing coil.

10. The valve assembly of claim 3 wherein said electromechanical means comprises a solenoid having a driving coil and an armature actuated by the flow of an electrical current through said driving coil to control the position of said valve means, and said means for producing and sensing comprises a sensing coil wound on a magnetic core for producing a magnetic flux following a path at least partially passing through said armature.

11. The valve assembly of claim 10 including a secondary coil magnetically coupled to said driving coil to form an electrical transformer, said secondary coil being electrically connected to said sensing coil for applying said second electrical signal to said sensing coil.

12. An apparatus for determining the position of an electromechanical valve assembly comprising valve means movable between open and closed positions, electromechanical means having a pair of electrical leads for actuating said valve means between said open and closed positions in response to a first electrical signal having a relatively low frequency applied to said leads, sensing means for disclosing the position of said valve means in response to a second electrical signal having a relatively high frequency applied to said leads, means for generating said first electrical signal electrically connected to said leads, means for generating said second electrical signal electrically connected to said leads, and means for electrically isolating said means for generating said first electrical signal from said means for generating said second electrical signal.

13. The apparatus of claim 12 wherein said means for isolating comprises reactive circuit elements connected to tend to exclude higher frequency signals from said means for generating said first electrical signal and to tend to exclude lower frequency signals from said means for generating said second electrical signal.

14. The apparatus of claim 12 including a first transformer, said means for generating said second electrical signal being connected to said leads through said first transformer.

15. The apparatus of claim 12 wherein said sensing means comprises means for producing a magnetic field indicative in intensity of the position of said valve means, and means for detecting the relative intensity of said magnetic field, said means for detecting comprising an electrical coil wound on a magnetic core and electrically connected in parallel to said electromechanical means, and said sensing means further comprising differential amplifier means for receiving said second electrical signal and for generating a third electrical signal indicative of the position of said valve means.

16. The apparatus of claim 12 wherein said means for generating said first electrical signal comprises a bridge circuit for producing a signal having a preselected polarity and having a frequency not exceeding about 200 Hz.

17. The apparatus of claim 12 wherein said means for generating said second electrical signal comprises an oscillator for producing a signal having a frequency greater than about 20 KHz as said second electrical signal.

18. A limited angle torque motor for rotating a shaft through a limited are incorporating a shaft position indicator comprising a shaft having an axis along its length, shaft bearings in which said shaft is journaled for rotation about said axis, a permanent magnet mounted on said shaft having magnetic poles transverse to said axis, a stator circumferentially disposed about said axis including a stator coil for conducting a first electric signal of a relatively low frequency to generate an electromagnetic field for interacting with the magnetic field of said permanent magnet to apply a torque to said shaft on said axis, said stator coil including electrical leads for supplying electrical current to said stator coil, and sensing means for disclosing the rotational position of said shaft in response to a second electrical signal applied to said leads and having a relatively high frequency.

19. The motor of claim 18 wherein said sensing means comprises means for producing a magnetic field indicative in intensity of said shaft position, and means for detecting the relative intensity of said magnetic field.

20. The motor of claim 19 wherein said means for detecting comprises an electrical coil disposed on a magnetic core and electrically connected in parallel to said stator coil.

21. The motor of claim 19 wherein said means for detecting comprises a second permanent magnet.

22. The motor of claim 19 wherein said means for detecting comprises a magnetically saturable reactor.

23. The motor of claim 22 including a secondary coil magnetically coupled to said stator coil to form an electrical transformer, said secondary coil being electrically connected to said sensing coil for applying said second electrical signal to said sensing coil.

* * * * *